May 6, 1924.

L. R. DAVIS

CUSHION TIRE 1,493,190

Original Filed May 4. 1923     2 Sheets-Sheet 1

Inventor
LAURENCE R. DAVIS

By his Attorney

May 6, 1924.

L. R. DAVIS

CUSHION TIRE 1,493,190

Original Filed May 4, 1923 2 Sheets-Sheet 2

Inventor
LAURENCE R. DAVIS
By his Attorney

Patented May 6, 1924.

1,493,190

UNITED STATES PATENT OFFICE.

LAURENCE R. DAVIS, OF NEW YORK, N. Y., ASSIGNOR TO MORGAN & WRIGHT, OF DETROIT, MICHIGAN, A CORPORATION OF MICHIGAN.

CUSHION TIRE.

Original application filed May 4, 1923, Serial No. 636,532. Divided and this application filed January 31, 1924. Serial No. 689,681.

*To all whom it may concern:*

Be it known that I, LAURENCE R. DAVIS, a citizen of the United States, and a resident of New York city, county of New York, and State of New York, have invented certain new and useful Improvements in a Cushion Tire, of which the following is a full, clear, and exact description.

This invention relates to solid tires, more specifically that type thereof known as "cushions", and this application is a division of another, Serial No. 636,532, filed May 4th, 1923.

Cushion tires having rubber body portions vulcanized to metallic base or rim sections as heretofore manufactured (with cores which were withdrawn after vulcanization, either through walls in the metallic base sections or by temporarily spreading the metallic base sections), have had a continuous and unbroken tread tying together their side walls or leg portions.

The present invention contemplates a tire whose rubber body portions are shaped internally to define, when assembled on a wheel, an internal cushioning formation surmounted by independent tread portions overhanging the metallic base sections and contacting, preferably with compression, so as to exclude the entrance of dirt stones or other foreign matter into the cavity, without impairing the independence of action of the several rubber body portions. The tire may function as a single cushion tire, or as dual cushion tires, but in both cases, the crack or cracks at the tread between the rubber body is maintained closed. The tire of this invention may be vulcanized readily in a factory without the troublesome operation of removing cores (the operations being similar to those used for years in removing vulcanizing mold sections). The tire sections may be vulcanized with very satisfactory uniformity. Two or more tire sections may be assembled on a wheel with or without a fastening together of their metallic base sections (if there are two, preferably without any such fastening). And any desired internal cushioning formation may be obtained with almost equal facility.

Embodiments of the invention are illustrated in the accompanying drawings, in which:—

Figures 6, 8:
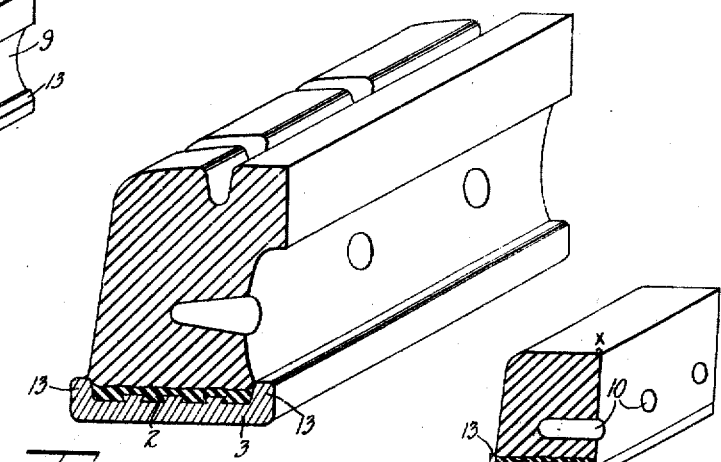
Figure 6 is a perspective of a single tire section showing a modified cushioning formation and also a typical tread design.

And Figure 8 illustrates a further modified form of complementary section.

Figure 7:
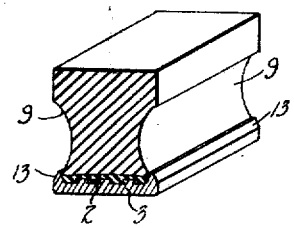
Figure 7 is a perspective of an intermediate tire section.

According to the invention, a mass of relatively soft rubber 1, of any suitable vulcanizable composition, and a stratum of relatively hard rubber 2 are assembled, as convenient, on a metallic base member 3. The assemblage is then introduced within the sections 4 and 5 of a mold, the latter carrying, as shown, a device or devices 6 for imparting a cavity formation of ovoidal, triangular, rectangular, or other desired shape, to one side or face of the rubber body. While the mold sections are held closed, the tire is subjected to suitable heat treatment and is completely vulcanized in a finished condition on its metallic base member. Thus, one of the complementary sections 7 of the tire is completed. Similarly, another section 8 may be manufactured in identically the same form. Intermediate sections, such as indicated at 9 in Figure 7, may likewise be built and cured in sectional molds with, however, curing devices similar to that shown at 6 located in shaping relation to both sides of the section.

It will be noticed that when the tire is cured, the parts of the mold and the core may be removed by displacement laterally of the tire section rather than as heretofore by an inward radial movement. This simplifies the vulcanizing operation in the factory very much, cheapens the cost of production materially, and enables the heat to be supplied to the mass of rubber in a manner, insuring uniform vulcanization and a reliably cured tire section.

The curing device or core 6 is preferably, but not necessarily, made integral with one of the sections of the mold and annular in form. Its cross-section may be as shown or of any desired shape whatever. Instead of an annular form, however, a series of pins or projections (not shown) may be employed to indent the inside or meeting faces of the sections, as shown at 10 in Figure 8 of the drawings.

Each of the vulcanized rubber body portions comprises a leg portion L, and a tread portion T which overhangs the leg portion. And preferably, but not necessarily, the tread portion projects across and beyond the vertical plane of the inside face of the metallic base section 3 by a slight amount, such as indicated at X, so as to insure a tight joint 11 being maintained between the contacting surfaces of the tread portions of the several sections, the tread portions being laterally under compression. This feature is desirable also because the metallic base members 3 may not come together in abutting relation or contact everywhere throughout their periphery when pressed fast to the felly-band of a wheel. It allows the manufacturer greater latitude in the factory. The relatively narrow stratum of rubber X—which may be and is preferably provided on the outer tire sections and may or may not be provided on the intermediate tire sections 9—insures a tight joint at the tread of the complete mounted tire despite irregularities in the base members and tends at all times to prevent the entrance of dirt, etc., into the cushioning cavity 12, or other cushioning formation that may be provided on the inside face of the section in from the tread. When the cushioning formation is of the character illustrated in Figure 8, that face may be bevelled or flared out slightly, as illustrated, so as to overhang the inside edge of the metallic base member and thus the same closure of the division between the tire sections insured.

The metallic base sections 3 are preferably shaped as shown on their outer surfaces to better the anchorage for the rubber bodies. The width of these sections, of course, should be that necessary to obtain the right width of tire when two or more of the sections are assembled. Preferably, the base members 3 are provided with flanges 13 on both margins, but, if desired, these flanges may be omitted on one or both margins, as illustrated, for instance, in Figure 5.

Figure 3:
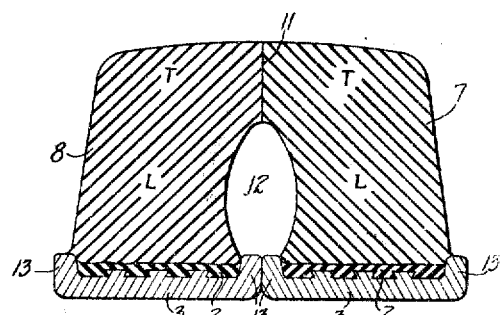
Figures 3, 4 and 5, are cross-sections of multiple-part cushion tires as they would appear when pressed fast to the felly-band of a wheel in working relation.
Figure 4:
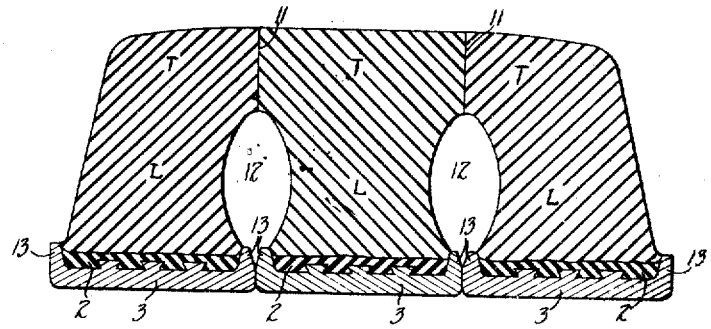
Figure 5:
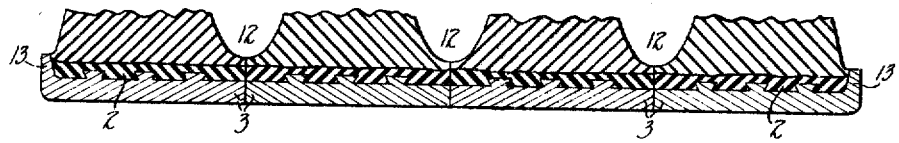

When two or more of the complete and vulcanized sections are pressed fast upon the felly-band of a wheel in the relation illustrated in Figures 3, 4 and 5, of the drawings, a cushion tire is formed which operates, under a load applied to the entire tread surface, as a one-piece hollow type cushion tire, the meeting faces of the tread working in opposition. But if the load is applied locally to one side only of the complete tire, the section thereof which is bearing the load will be compressed and yield as a single cushion tire, its leg portion L bending and its tread portion T moving against the unloaded section and maintaining closed the crack or division between the sections. Thus in applicant's tire, the capabilities of two different types of tires are obtained. In its preferred form, the opposed tread portions of the tire are under compression at the seam 11, each thrusting laterally against the other to maintain a tight joint and exclude foreign matter from entrance into the cushioning formation, whatever it may be. The independent metallic base members 3 may be, and desirably are, pressed into abutting relation and each may be pressed fast to position on the felly-band of a wheel so as to grip the same tightly and independently of the other. No fastening bolts, key-pieces, locking-plates, welding of the metallic base members together, or other similar expedients, are required ordinarily, but may be used when and if needed.

Figure 1:
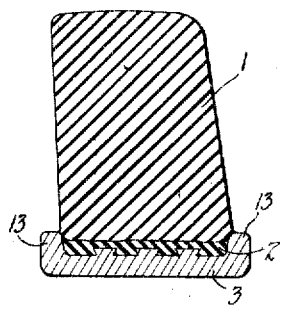
Figure 1 is a cross-section showing vulcanizable rubber massed on a metallic base member ready for vulcanization.
Figure 2:
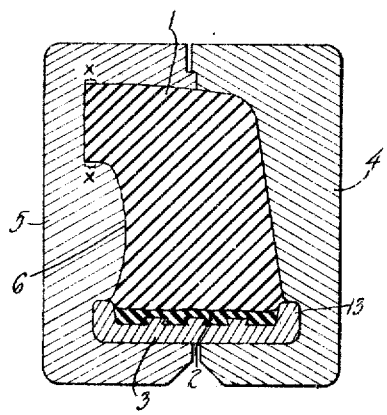
Figure 2 is a cross-section of a complementary tire section as it appears in a vulcanizing mold.

While, in the foregoing, emphasis has been laid upon a closing stratum of rubber between the sections, such as indicated at X, Figure 2, this feature may be omitted if desired but not, it is believed, without sacrificing some of the advantages of the invention. Optionally, also, it is within the broad aspects of the invention to cement the seam 11 closed with a vulcanizable composition of either a cold or hot curing character, but this I do not deem desirable. It is to be understood that the drawings are merely illustrative and that the proportions of the tire sections may be varied widely. In practice, very satisfactory service tests have been obtained with sections 4" or more width.

It will be obvious that many changes may be made without departing from the principles underlying the invention. Reference should therefore be made to the appended claims for an understanding of the scope of the invention. In the claims, the term "cushion" is intended to comprehend solids with an internal cavity formation whether or not the tire is externally grooved, indented, or otherwise shaped, on its tread surface or side walls, or both, for traction or additional cushioning purposes.

Having thus described my invention, what I claim and desire to protect by Letters Patent is:—

1. A cushion tire comprising distinct complementary sections each having a leg and tread of rubber composition vulcanized to a metallic base member, the metallic base members being adapted to be pressed fast to the felly band of a wheel with said tread portions laterally in contacting relation and said leg portions separated to define an annular internal cavity formation.

2. A cushion tire consisting of distinct complementary sections each having a rubber body vulcanized to a metallic base member, said sections being adapted to be pressed fast onto the felly band of a wheel in contiguous relation and with portions of their opposed faces in and out of contact the latter defining an internal hollow cushioning formation enhancing the yielding properties of the tire.

3. A cushion tire consisting of permanent separate complementary sections each having a rubber body vulcanized to a metallic base member, said sections being adapted to be pressed fast to the felly band of a wheel to form the complete tire, the opposed faces of the rubber bodies of the complementary sections being squeezed together at their outer periphery and inwardly thereof channeled circumfenentially to define a substantially closed annular cavity augmenting the cushioning properties of the tire.

4. A cushion tire comprising separate and distinct sections, each section consisting of a metallic base member and composition rubber body vulcanized thereto and each of the rubber bodies having a leg portion and a tread portion overhanging the base member, the tread portions being adapted to be held in contact when the sections are mounted on the felly band of a wheel, and the said leg portions being shaped to define a hollow internal cushioning formation.

5. A cushion tire comprising separate and distinct sections, each section consisting of a metallic base member and composition rubber body vulcanized thereto and each of the rubber bodies having a leg portion and a tread portion overhanging the base member, the tread portions being adapted to be held in contact and under lateral compression by the metallic base members when the same are secured fast to the felly band of a wheel in working relation, and the said leg portions being shaped to define when assembled an annular internal cushioning formation.

6. A cushion tire consisting of distinct complementary sections each having a rubber body vulcanized to a metallic base member, said sections being adapted to be pressed fast onto the felly band of a wheel in contiguous relation and having portions of their opposed faces inward of their treads out of contact to define an internal cushioning formation enhancing the yielding properties of the tire, each of said metallic base members having marginal flanges confining the inner portions of the rubber body vulcanized thereto.

Signed at New York city, County of New York, and State of New York, this 30th day of January, 1924.

LAURENCE R. DAVIS.